United States Patent
Johansson

(10) Patent No.: US 6,621,802 B1
(45) Date of Patent: Sep. 16, 2003

(54) METHOD AND APPARATUS FOR SUBSTANTIALLY SIMULTANEOUS AUDIO AND DATA COMMUNICATION OVER A WIRELESS LINK

(75) Inventor: Hans Göran Peter Johansson, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/079,302

(22) Filed: May 15, 1998

(51) Int. Cl.[7] .................................................. H04J 3/16
(52) U.S. Cl. ...................................... 370/329; 370/465
(58) Field of Search .............................. 370/261, 347, 370/259, 527, 329, 401, 351, 352, 465, 474, 206, 260, 336, 263, 339, 277, 343, 282, 345, 433, 436, 437, 442, 476, 479, 498, 506, 529, 903, 908, 915, 916; 714/46; 455/553, 426; 704/270; 348/15; 375/222, 240; 379/93.09; H04Q 7/22; H04M 3/56; H04L 29/10

(56) References Cited

U.S. PATENT DOCUMENTS

| | | | | |
|---|---|---|---|---|
| 5,497,373 A | * | 3/1996 | Hulen et al. .................... 370/79 |
| 5,581,560 A | * | 12/1996 | Shimada et al. ............. 370/527 |
| 5,602,902 A | * | 2/1997 | Satterlund et al. ............. 379/59 |
| 5,606,599 A | * | 2/1997 | O'Mahony et al. ....... 379/93.04 |
| 5,689,553 A | * | 11/1997 | Ahuja et al. ................. 370/260 |
| 5,805,636 A | * | 9/1998 | Rao et al. .................... 375/222 |
| 5,835,480 A | * | 11/1998 | Chennakeshu .............. 370/206 |
| 5,896,375 A | * | 4/1999 | Dent et al. ................... 370/347 |
| 5,943,046 A | * | 8/1999 | Cave et al. .................. 345/327 |
| 6,021,119 A | * | 2/2000 | Derks et al. ................. 370/261 |
| 6,044,108 A | * | 3/2000 | Bertness et al. ............. 375/222 |
| 6,112,084 A | * | 8/2000 | Sicher et al. ................ 455/426 |

FOREIGN PATENT DOCUMENTS

| | | | | |
|---|---|---|---|---|
| EP | 0661893 | * | 7/1995 | ............ H04Q/7/22 |
| EP | 661893 | | 7/1995 | ............ H04Q/7/22 |
| EP | 817456 | | 1/1998 | ............ H04M/3/56 |
| EP | 0817456 | * | 1/1998 | ............ H04M/3/56 |
| WO | WO96/35286 | | 11/1996 | ............ H04L/29/10 |
| WO | WO 96/35286 | * | 11/1996 | ............ H04L/29/10 |

OTHER PUBLICATIONS

ITU–T Recommendation V.80; Series V: Data Communication Over The Telephone Network, Interfaces and voiceband modems; "In–Band DCE Control and Synchronous Data Modes for Asynchronous DTE", Aug. 1996.

ITU–T Recommendation V.76: Series V: Data Communication Over The Telephone Network, Interfaces and voiceband modems; Generic Multiplexer Using V.42 LAPM–Based Procedures, Aug. 1996.

ITU–T Recommendation V.75: Series V: Data Communication Over The Telephone Network, Interfaces and voiceband modems; "DSVD Terminal Control Procedures", Aug. 1996.

ITU–T Recommendation V.70: Series V: Data Communication Over The Telephone Network, Transmission quality and maintenance; "Procedures for the Simultaneous Transmission of Data and Digitally Encoded Voice Signals over the GSTN, or over 2–Wire Leased Point–to–Point Telephone Type Circuits", Aug. 1996.

International Search Report re 101315 Date of mailing of search: Nov. 17, 1998.

* cited by examiner

Primary Examiner—Dang Ton
(74) Attorney, Agent, or Firm—Burns, Doane, Swecker & Mathis, L.L.P.

(57) ABSTRACT

An apparatus and method for achieving substantially simultaneous audio and data communication over a wireless communication link using established standard protocols. First and second DSVD multiplexers are provided in the apparatus for mapping DSVD frames containing audio and data signals into a wireless communication protocol, and vice versa. A switch or other selection means is provided to selectively operate according to a standard DSVD protocol or the wireless communication protocol.

15 Claims, 6 Drawing Sheets

METHOD AND APPARATUS FOR SUBSTANTIALLY SIMULTANEOUS AUDIO AND DATA COMMUNICATION OVER A WIRELESS LINK

FIELD OF THE INVENTION

The present invention relates to a communication method and apparatus for achieving substantially simultaneous real-time audio and data communication over a wireless communication link.

BACKGROUND OF THE INVENTION

As a results of the relatively rapid development of communications technology, many devices such as personal computers now include communications capabilities, including wireless communication capabilities, as a standard feature. However, the wireless communication capabilities of personal computers are limited by the lack of sufficient connection between the wireless communication components and the sound system of the personal computer. For example, the current GSM mobile telephone specifications that cover connections to external equipment such as PCs (GSM 7.05, 7.07) do not provide for a multichannel interface. Further, there are not currently standardized protocols for transferring voice and data substantially simultaneously over a COM port (PCMCIA interface) to a mobile telephone (such as a PCMCIA card phone).

Many digital wireless communication networks have the capability to transfer voice and data substantially simultaneously. For example, GSM and other systems offer a short message service (SMS) capability in which short messages can be transmitted while a voice connection is established. However, the conventional mobile telephone interface does not allow real-time voice data to be transmitted from the mobile telephone substantially simultaneously with other data.

Systems are known which achieve substantially simultaneous audio and data communication. For example, U.S. Pat. No. 5,581,560 to Shimada et al. discloses a method and system for communicating between separate electronic devices; however, the method and system contemplate that each communicating device has a modem capable of simultaneous audio and data communication. It would be desirable to achieve substantially simultaneous real-time audio and data communication over a wireless communication link using standardized protocols, and without requiring a receiving communication device to contain components identical to those in the transmitting device. It would be further desirable to achieve such substantially simultaneous audio and data communication with audio information being input and/or output through the sound components of a personal computer.

SUMMARY OF THE INVENTION

The present invention overcomes the foregoing problems, and achieves other advantages, by providing for a method and apparatus for achieving substantially simultaneous audio and data communication in which an apparatus operates according to a standard protocol such as DSVD (Digital Simultaneous Voice and Data). According to exemplary embodiments of the present invention, an apparatus includes a microprocessor through which voice and data signals are provided as DSVD frames, and a wireless communication device such as a mobile telephone for receiving audio and data signals from the microprocessor, mapping the audio and data signals into wireless channels defined according to a wireless communication protocol (GSM, etc.) and transmitting or receiving the audio and data signals substantially simultaneously over a wireless communication link. The wireless communication device can be a PCMCIA card phone or a conventional mobile telephone. The apparatus preferably includes first and second DSVD multiplexers in the microprocessor and the wireless communication device, respectively, and a PCMCIA interface between the DSVD multiplexers. The apparatus can be selectively operated in either a dual audio/data mode, which does not require a second apparatus to include a DSVD modem, or alternatively in a standard DSVD mode for communication with a second apparatus having a DSVD modem.

According to further exemplary embodiments, a method according to the present invention includes the steps of: initializing a communication device to operate in one of two or more modes, the two or more modes including a substantially simultaneous audio and data mode and a standard DSVD mode; receiving audio and data signals from a microprocessor as DSVD frames and mapping the audio and data signals into a standard wireless communication protocol (GSM, etc.); and transmitting the audio and data signals substantially simultaneously over a wireless communication link.

The mapping of the method and apparatus according to the present invention allows substantially simultaneous communication to be achieved without the requirement that each communicating apparatus include a standard DSVD modem or multiplexer. The apparatus and method are adaptable to allow communication in multiple modes including a first mode for communication according to a standard wireless protocol and a second mode for communication according to a standard DSVD protocol.

BRIEF DESCRIPTION OF THE DRAWINGS

The present invention can be more fully understood upon reading the following Detailed Description of the Preferred Embodiments in conjunction with the appended drawings, in which like reference indicia designate like elements, and in which.

DETAILED DESCRIPTION OF THE PREFERRED EMBODIMENTS

Figure 1:
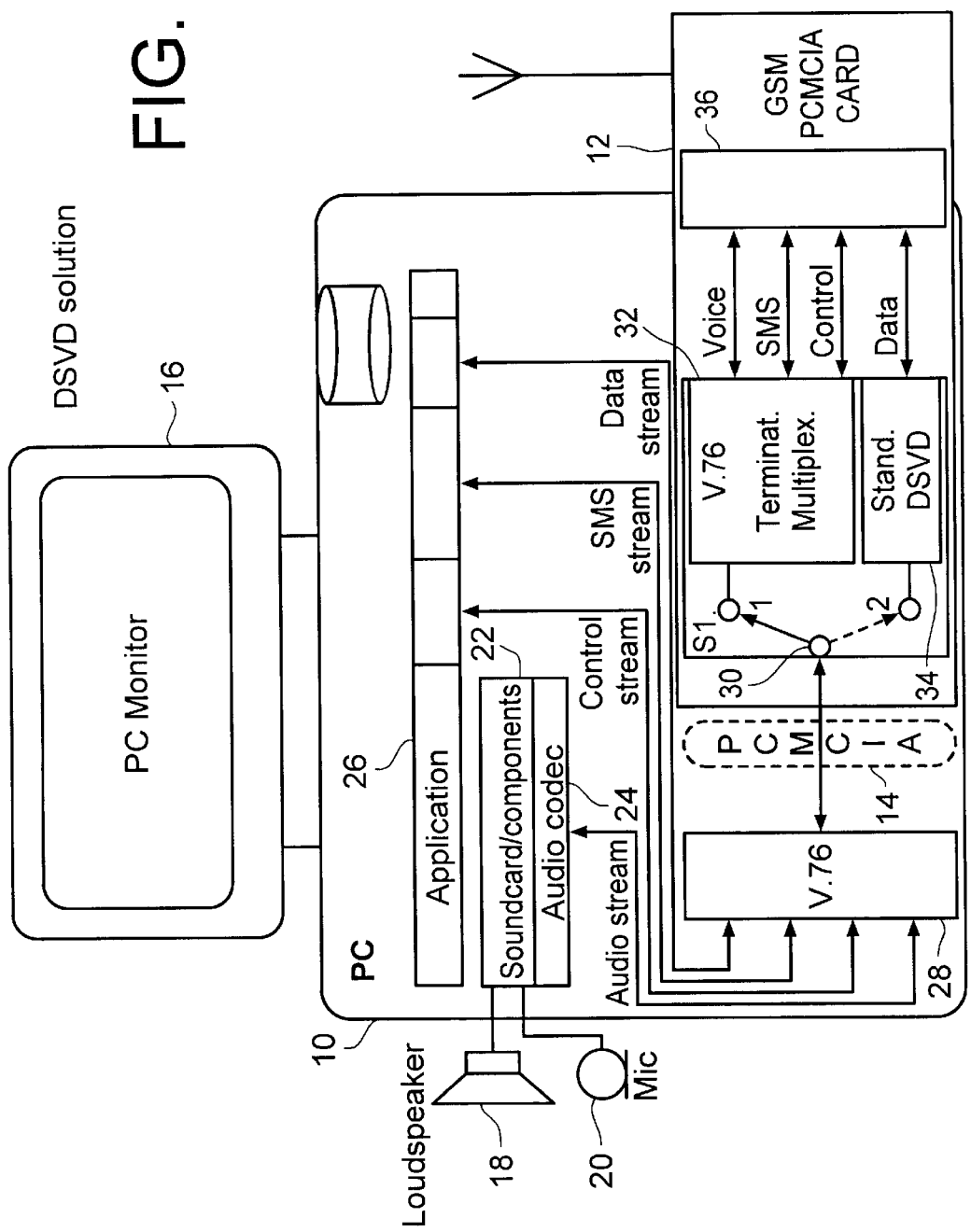
FIG. 1 is a block diagram of an exemplary apparatus according to the present invention for achieving substantially simultaneous audio and data communication.

Referring now to FIG. 1, an exemplary apparatus for achieving substantially simultaneous audio and data communication is shown. The apparatus includes a personal computer 10, which conventionally contains and is controlled by a microprocessor, and a wireless communication device 12 for exchanging communication signals using any one or more conventional wireless communication protocols. The wireless communication protocols can be D-AMPS (Digital American Mobile Phone System), CDMA (code division multiple access), GSM (Global Standard for Mobile communications), PCS (personal communication services), PDC (Portable Digital Cellular), or any other suitable wireless communication protocol. The personal computer 10 and wireless communication device 12 are linked by a conventional PCMCIA (Personal Computer Memory Card International Association) interface 14. The personal computer 10 includes a conventional monitor 16 for displaying information. The personal computer 10 includes conventional peripheral components such as a loudspeaker 18 and a microphone 20. These peripheral components are connected to a soundcard 22, and an audio codec (coder/decoder) 24 is preferably connected to the soundcard 22 for compressing or expanding audio information transferred from the microphone 20 or to the loudspeaker, 18, respectively. The codec 24 is advantageously provided to minimize the bandwidth of transmitted signals, and can be implemented by a GSM 6.1 codec or other suitable component. The personal computer 10 further includes application software or components 26 for processing various types of communication signals.

The personal computer 10 further includes a first multiplexer 28 which exchanges audio signals with the codec 24 and which exchanges other types of communication signals (e.g., control data, short message service (SMS) data, or other data) with the application software or components 26. The first multiplexer 28 exchanges communication signals, via the PCMCIA interface 14, with the wireless communication device 12.

The wireless communication device 12 includes a logical switch 30 or other selection means which in a first position connects the first multiplexer 28 with a second multiplexer 32, and in a second position connects a standard DSVD device 34 with the first multiplexer 28. The second multiplexer 32 exchanges voice, SMS, and control data with the transceiver circuitry 36 of the wireless communication device 12, and the DSVD device 34 exchanges data signals with the transceiver circuitry 36. The first and second multiplexers 28 and 32 are, according to this example, V.76 DSVD multiplexers. It should be appreciated that as a result of providing two DSVD multiplexers within the same apparatus, simultaneous voice and data communication can be established between the apparatus and a second device, without the need for the second device to include a DSVD multiplexer or modem, as is conventionally required for DSVD communication. The first and second multiplexers 28 and 32 can be implemented by V.76 DSVD multiplexers or other suitable components for mapping simultaneous voice and data signals into a wireless communication format.

In operation, the switch 30 is initialized (set) to the first position, the application software or components 26 or the codec 24 supply audio and data information substantially simultaneously (for example, in DSVD frames according to standard V.42 LAPM (Link Access Protocol for Modems) procedures). The audio and data frames are provided to the wireless communication device 12 via the first multiplexer 28 and the PCMCIA interface 14. The wireless communication device 12 receives, at its second multiplexer 32, the frames of voice, SMS, control data, etc., maps these signals into wireless channel structures for transmission according to a conventional wireless protocol. For GSM, for example, the DSVD voice frames are mapped into traffic channels TCH, and DSVD data frames can be mapped to a dedicated control channel DCCH. It will be appreciated that for other types of wireless communication networks, different channel structures and different mappings will be used.

The apparatus can also receive information, with the switch 30 is initialized (set) to the first position. A communication signal (e.g., a 13 kbit/s voice stream on a GSM traffic channel, along with SMS information) is received by the transceiver circuitry 36 of the wireless communication device 12. The received traffic channel voice frames are mapped to DSVD voice frames by second DSVD multiplexer 32, SMS frames are mapped to DSVD data frames, and the DSVD voice and data frames are communicated to the personal computer 10 via the PCMCIA interface 14 and the first DSVD multiplexer 28. arrangement between DSVD device 34 and the DSVD modem of a separate device. The DSVD communication can be performed over a wireless (as shown in FIG. 1) or wireline transmission medium.

The present invention as described above uses a standard DSVD protocol in a personal computer for substantially simultaneous voice and data communication using known DSVD standard protocols, such as V.70, V.75, V.76, etc. By providing separate DSVD multiplexers within a single communication apparatus, the apparatus can communicate with a separate device which does not include a DSVD modem. By providing a switch or other suitable means to select between a second DSVD multiplexer and a standard DSVD modem, an apparatus according to the present invention can selectively communicate with either a non-DSVD device or a device having a standard DSVD modem.

Figure 2:
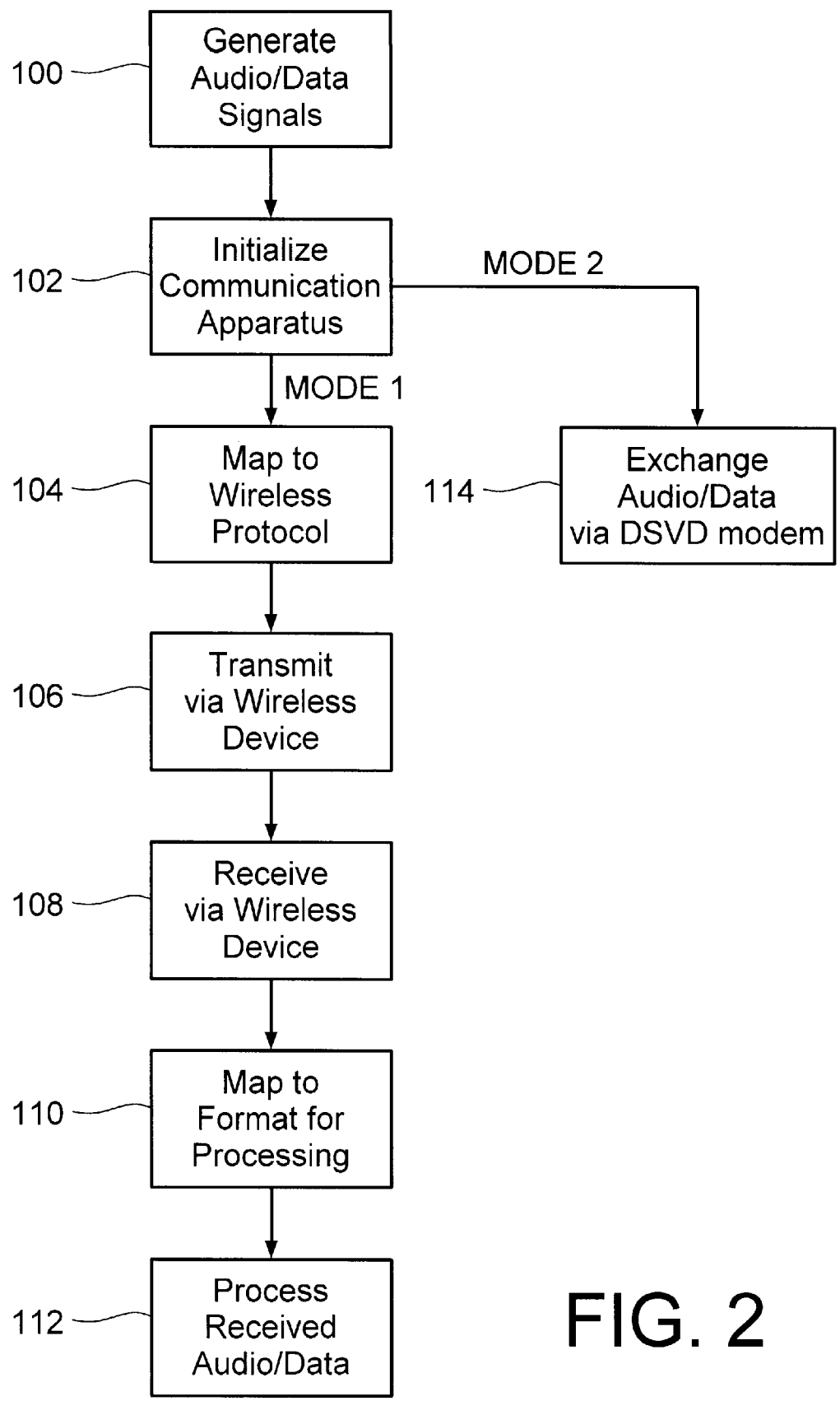
FIG. 2 is a flow chart describing a method according to the present invention.

Referring now to FIG. 2, a flow chart illustrating a method according to the present invention is shown. In step 100, the apparatus to perform the substantially simultaneous audio and data communication is initialized to operate in one of a plurality of modes, including a first mode for performing substantially simultaneous audio and data communication and a second mode for performing conventional DSVD communication with a device having a DSVD modem. The determination can be performed interactively by a suitably-programmed microprocessor associated with the apparatus. When the apparatus is initialized in the first mode, the method proceeds to step 102, in which audio and/or data signals are generated, e.g., in a personal computer, for substantially simultaneous transmission. In step 104, the audio and data signals are mapped into a format appropriate for a wireless communication protocol (e.g., GSM, CDMA, D-AMPS, PCS, PDC, etc.), and the mapped audio and data signals are provided, via a PCMCIA interface to a wireless communication device for transmission. In step 106, the audio and/or data signals are transmitted over a wireless communication link according to the wireless communication protocol. In step 108, audio and/or data signals are received over the wireless communication link according to the wireless communication protocol. In step 110, the received audio and data signals are mapped into a format appropriate for processing by the apparatus (e.g., DSVD audio and data frames for processing by a personal computer). The mapping can be performed by DSVD multiplexers linked by a PCMCIA interface. In step 112, the mapped received signals are processed as necessary by the apparatus to display data on a monitor, provide audio output via sound components associated with the personal computer, etc.

If, in step 102, the apparatus is initialized to operate in the second mode, the audio and data signals are, in step 114, exchanged between a standard DSVD modem contained in the wireless communication device (e.g., via a single DSVD multiplexer over a PCMCIA interface, while bypassing a second DSVD multiplexer in the wireless communication device), as necessary for communication with a device having a DSVD modem or other suitable componentry for substantially simultaneous audio and data communication.

The versatility of the present invention can be demonstrated by the examples shown in FIGS. 3A–D. In the example shown in FIG. 3A, a voice call is established between a standard telephone 40 and an apparatus 52 according to the present invention through a public switched telephone network PSTN 42, and a mobile network 44 including a mobile switching center (MSC) 46, a base station controller (BSC) 48, and a base station 50.

Figure 3A:
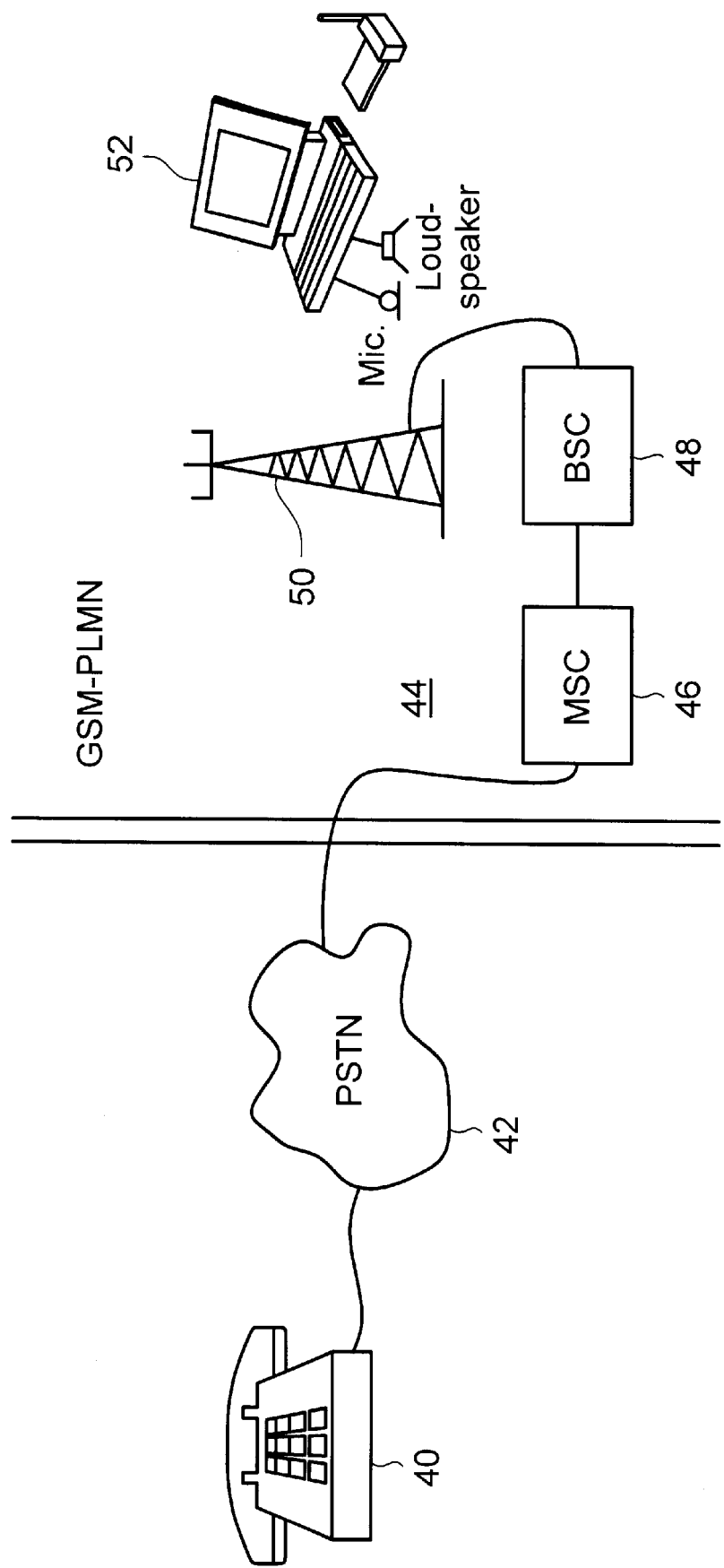
FIGS. 3A–D are diagrams showing exemplary communication arrangements made possible by an apparatus according to the present invention.
Figure 3B:
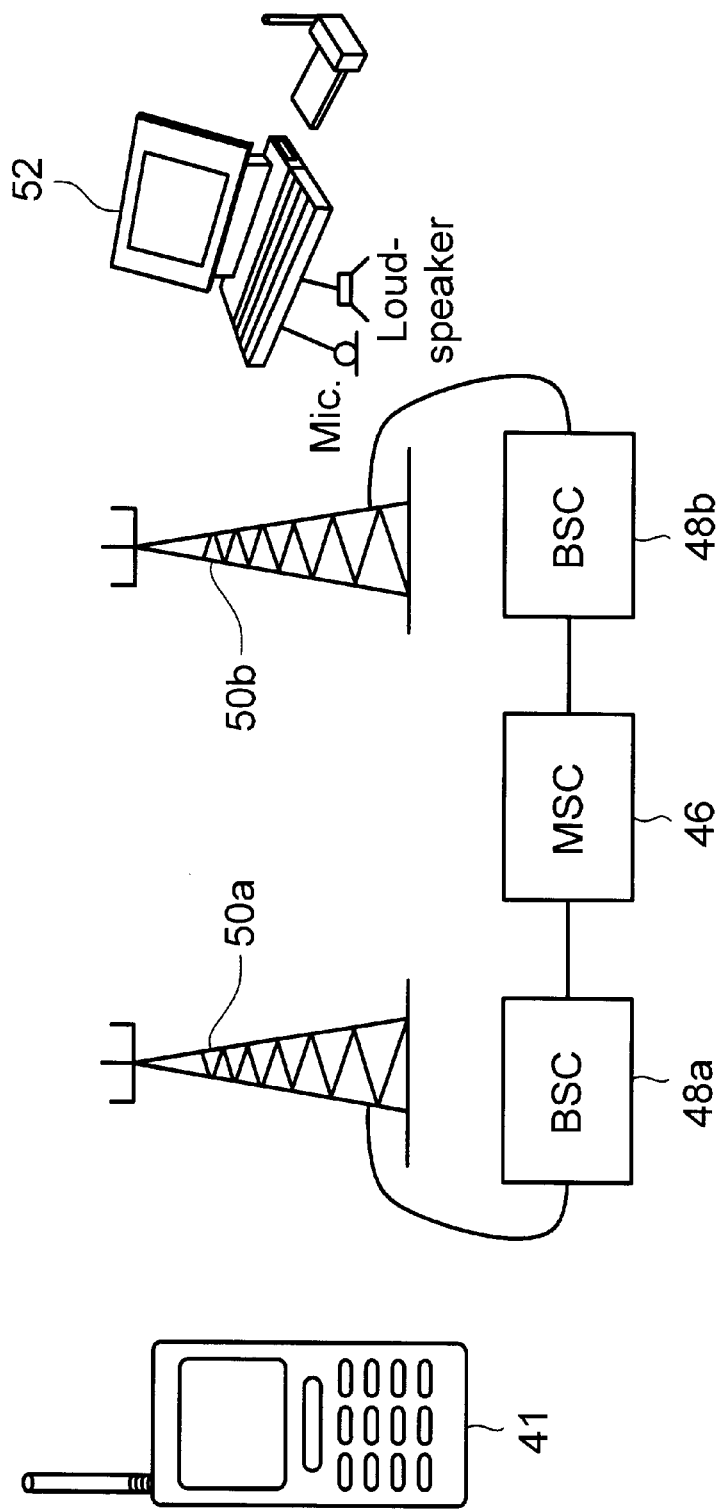

In the example shown in FIG. 3B, a voice call is established between a mobile telephone 41 and an apparatus 52 according to the present invention through a mobile telephone system including first base station 50a, first base station controller 48a, mobile switching center 46, second base station controller 48b, and second base station 50b.

Figure 3C:
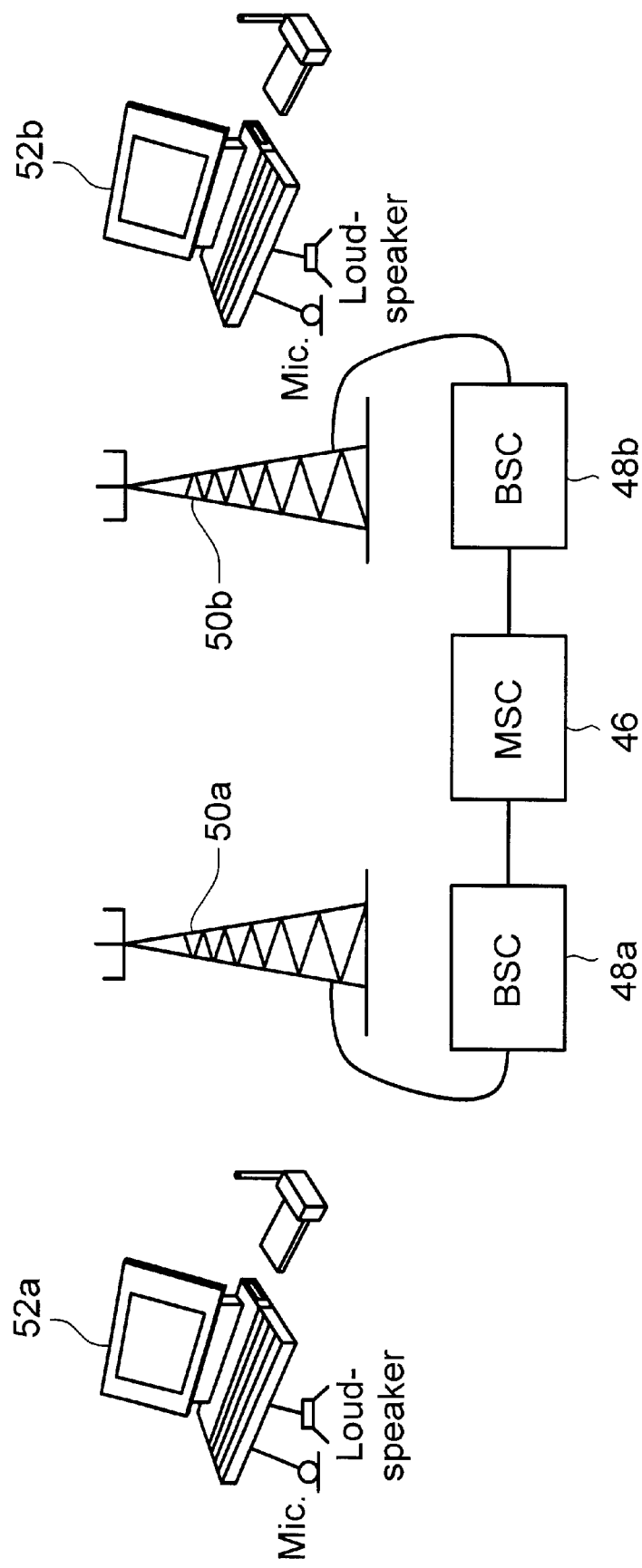

In the example shown in FIG. 3C, a voice call and SMS (short message service) transmission can occur substantially simultaneously. This arrangement can also allow for the transmission of facsimile and electronic mail. This example includes first and second apparatuses 52a and 52b which communicate via first and second base stations 50a and 50b, first and second base station controllers 48a and 48b, and mobile switching center 46.

Figure 3D:
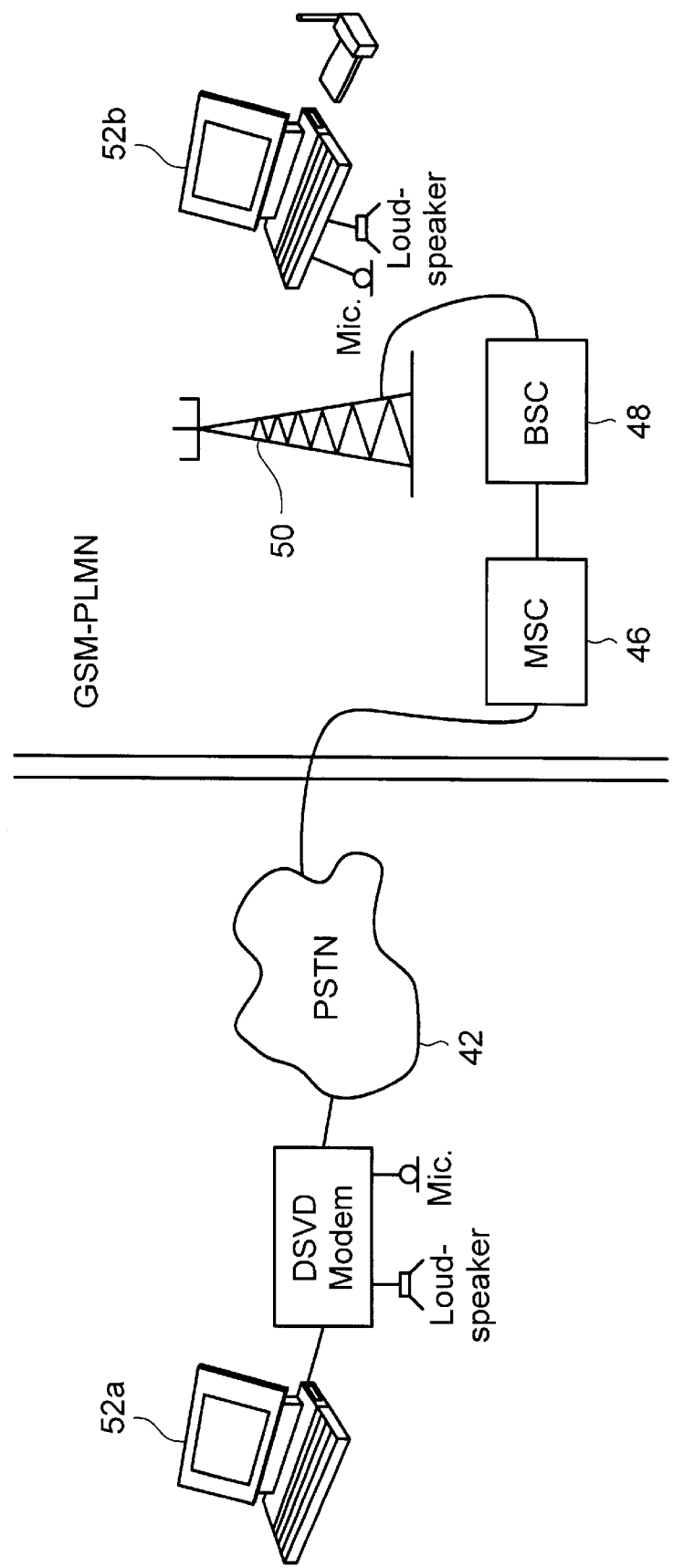

In the example shown in FIG. 3D, a standard DSVD connection for transmitting voice/data, electronic mail, and/or facsimile data substantially simultaneously. This example includes first and second apparatuses 52a and 52b, a public switched telephone network 42, a mobile switching center 46, base station controller 48, and base station 50. It should be noted that in this example, the apparatus 52a is configured so as to transfer data using a standard DSVD modem (that is, referring back to FIG. 1, the switch 30 or other selection means is in the second position).

While the foregoing description includes many details and specificities, it is to be understood that these are intended solely for explanatory purposes, and are not to be construed as limitations of the present invention. Many modifications to the disclosed details will be readily apparent to those of ordinary skill in the art which are within the spirit and scope of the invention, as defined by the following claims and their legal equivalents.

What is claimed is:

1. An apparatus for communicating voice and data communication signals substantially simultaneously over a communication link, comprising:
    a computer for providing voice and data signals as Digital Simultaneous Voice and Data frames; and
    a wireless communication device for receiving the Digital Simultaneous Voice and Data frames from the computer, mapping the voice frames into first wireless channels and mapping the data frames into second wireless channels, wherein the first and second wireless channels are defined according to a wireless communication protocol, and transmitting the voice and data signals substantially simultaneously over a wireless communication link.

2. The apparatus of claim 1, wherein the computer performs expansion or compression of the voice signals.

3. The apparatus of claim 2, wherein the computer includes a GSM 6.1 codec for performing the expansion or compression of the voice signals.

4. The apparatus of claim 1, wherein the wireless communication device also receives voice and data signals and supplies the received voice and data signals to the computer as Digital Simultaneous Voice and Data frames.

5. The apparatus of claim 1, further comprising a PCM-CIA interface between the computer and the wireless communication device for exchanging communication signals between the computer and the wireless communication device.

6. The apparatus of claim 1, wherein the wireless communication protocol is one of: GSM, D-AMPS, CDMA, PCS or PDC.

7. A method for communicating between first and second communication devices, comprising the steps of:
    initializing a first communication device to operate in one of at least two modes, including a first mode for mapping audio and data signals contained in DSVD frames into a wireless communication protocol and a second mode for conducting substantially simultaneous audio and data communication according to a DSVD protocol;
    receiving audio and data signals as DSVD frames;
    mapping the audio and data signals into first and second wireless communication channels respectively in the first mode and mapping the audio and data signals together into the first wireless communication channels in the second mode, wherein the first and second wireless communication channels operate according to the wireless communication protocol; and
    transmitting the audio and data signals substantially simultaneously.

8. The method of claim 7, wherein the step of mapping is performed by a DSVD multiplexer.

9. The method of claim 8, wherein the DSVD multiplexer operates according to the DSVD V.76 standard.

10. The method of claim 7, further comprising the steps of:
    receiving audio and data signals substantially simultaneously according to the wireless communication protocol;
    mapping the audio and data signals into DSVD frames;
    providing the DSVD frames to a computer; and
    outputting the audio information contained in the DSVD frames over sound system components of the computer.

11. The method of claim 10, further comprising the steps of:
    compressing the audio signals prior to the step of receiving the audio and data signals as DSVD frames; and
    decompressing the audio signals contained in the DSVD frames prior to the step of outputting.

12. The method of claim 7, wherein the wireless communication protocol is one of GSM, D-AMPS, CDMA, PCS, or PDC.

13. The apparatus of claim 1, wherein the wireless communication device includes a switch for switching between mapping the Voice and Data frames into the first and second wireless communication channels respectively, and mapping the Voice and Data frames together into the first wireless communication channels.

14. The method of claim 7, wherein the first wireless communication channels are traffic channels and the second wireless communication channels are control channels.

15. An apparatus for communicating voice and data communication signals substantially simultaneously over a communication link which includes traffic channels and control channels, comprising:
    a computer for providing voice and data signals as Digital Simultaneous Voice and Data frames; and
    a wireless communication device for receiving the Digital Simultaneous Voice and Data frames from the computer, mapping the voice frames into a wireless traffic channel and mapping the data frames into a wireless control channel wherein the voice and data signals are transmitted substantially simultaneously over a wireless communication link.

* * * * *